United States Patent Office 2,769,619
Patented Nov. 6, 1956

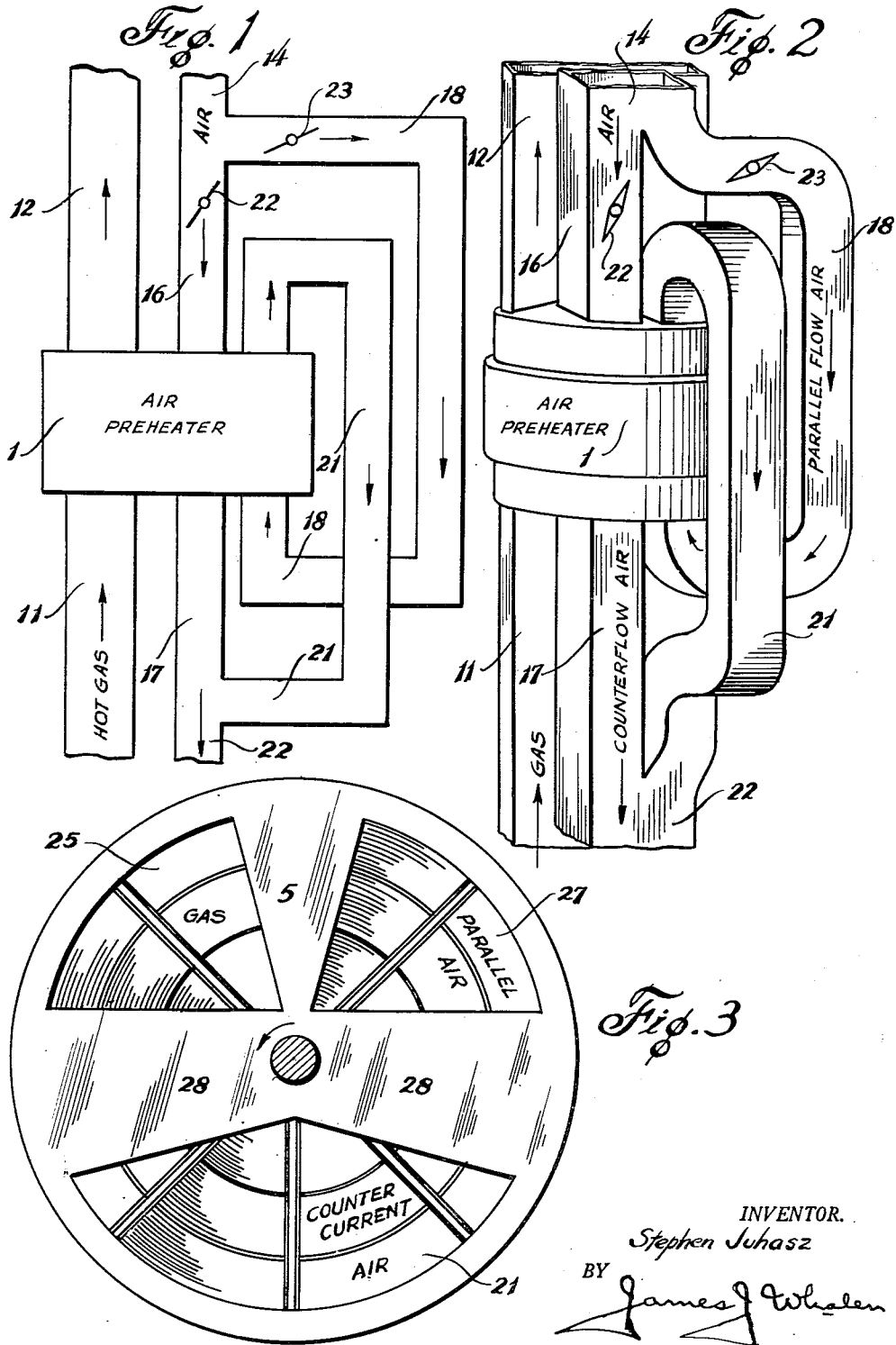

2,769,619

PARALLEL AND COUNTERFLOW OF AIR IN PREHEATER

Stephen Juhasz, San Antonio, Tex., assignor to The Air Preheater Corporation, New York, N. Y., a corporation of New York Application February 19, 1952, Serial No. 272,317

5 Claims. (Cl. 257—6)

The present invention relates to heat exchange apparatus and particularly to an improved arrangement for minimizing corrosion in air preheaters or the like.

One of the most important problems in heat exchangers is to prevent lowering the metal temperature of the heat transfer surface below the dew point of the flue gases to avoid condensation on the surface from these gases. This condensate results in accumulation of deposits on the heating surface and in addition corrosion of the surface occurs if the condensate contains acids.

To avoid the above difficulties, different methods have been suggested to increase the temperature of the heat exchange elements. As is known, a heat exchanger for transfer of heat between hot gases and cold air can be arranged either for counterflow or parallel flow. In the case of counterflow, heat exchange is high; this results in the temperature of the flue gases being reduced to a point where in contact with the walls of a heat exchanger they may be cooled below the dew point. With parallel flow, this danger does not exist usually; while, on the other hand, the exchange of heat is normally too low and results in the flue gases leaving the heat exchanger at too high temperatures; also, a maximum mean temperature efficiency of only 50% is possible and the temperature of the heated air is relatively low.

Various arrangements have been proposed to arrive at a counterflow system that would be more practical from a condensation point of view. Some of these arrangements are as follows:

(a) To bypass cold air around the heat exchanger in order to obtain higher wall or heating surface temperature by reduction in air mass flow as in the Cooper Patent 2,321,129 of June 8, 1939.

(b) To return part of the heated air to the heat exchanger through recirculation as in the Cooper Patent 2,320,911 issued June 1, 1943; or (c) To mix part of the hot gases with the cold air ahead of the heat exchanger as in Lysholm Patent 1,829,996 issued November 3, 1931, or Patterson Patent 1,941,365 of December 26, 1933.

All of the above arrangements have certain weaknesses: the reduction of temperature of the preheated air and the increase in the temperature of the gases leaving in relation to the resulting temperature increase of the walls or heating surface is unfavorable or necessitates high expenditures for equipment or operating cost. With an arrangement according to (b) cost of recirculation is added and with (c) danger of condensation on both gas and air sides exists.

This invention contemplates an arrangement in a heat exchanger which makes possible a more favorable relation between the reduction of the preheated air temperature and the increase in the temperature of the gases leaving on one side and the increase in temperature of the wall or surface on the other side; this is accomplished without increase in fan power. In carrying out the invention part of the total volume of cold air to be heated is directed through the heat exchanger in counterflow with the flue gases while another part is taken through the heat exchanger in parallel flow with the gas stream. Following this, the two air streams are combined and carried to the point of usage in a single conduit.

By this arrangement, a more favorable combination of the advantages of counterflow and parallel flow systems is obtained than with previously known arrangements in that it is possible to maintain a wall or heating surface temperature at the cold end of the heat exchanger sufficiently high to prevent condensation but still not unnecessarily high.

An illustrative embodiment of the invention will be described with reference to the accompanying drawing wherein Figure 1 schematically shows a heat exchanger according to the invention and Figure 2 is a perspective view showing the invention applied to a rotary regenerative type of heat exchanger.

Figure 3 is a diagrammatic plan view of a rotary regenerative preheater and illustrates the arrangement of gas and air passages in accordance with the invention.

In Fig. 1 the heat exchanger is designated by the numeral 1 and the inlet and outlet ducts for the flow of the gases by the numerals 11 and 12. 14 indicates a conduit for the entering cold air which is split in two streams, one which passes via duct 16, 17 through the heat exchanger in counterflow to the gases with the other stream through duct 18, 21 from which the air conveyed to the "hot end" of the exchanger thereby passes the heat exchanger in parallel flow to the gases after which the outlet parts 17 and 21 of the two branches are again united in duct 22. Dampers are provided at 22 and 23.

In Fig. 3 is indicated how the rotor of a rotating regenerative type of heat exchanger is divided into three parts, 25 for gases, 26 for the counterflow air and 27 for the parallel flow air separated by imperforate sectors 28 in the housing end plates.

A rotary regenerative heater of the Ljungstrom type has a cylindrical rotor divided into compartments carrying metallic heat transfer plates which as the rotor turns are first exposed to the heating gases and then disposed in the air passage to impart the absorbed heat to the air. The rotor is surrounded by a housing having end or sector plates formed with openings to provide for the flow of gas and air and in order to preclude the flow of gas or air through the clearance space between the rotor and housing without passing over the heat transfer material it is customary to provide the rotor with circumferential seals that bear against the sector plates or other stationary parts. Radial seals mounted on the partitions forming the compartments whose width is less than the gas and air openings prevent crossflow of fluids over the ends of the rotor.

Calculations made for the purpose of comparing the arrangement covered by this invention with systems earlier used were carried out on the basis of the same entering gas temperature 450 deg. C. and the same cold air temperature 20 deg. C.; further, it was assumed a preheated air temperature of 350 deg. C. and a temperature of the cooled flue gases of 186 deg. C. at pure counterflow. These calculations show that the metal temperature at the cold end of the heat exchanger is considerably higher than with pure counterflow but still not unnecessarily high as with parallel flow and that the temperature reduction of the preheated air and the increase in temperature of gases in relation to the increase in wall or heating surface temperature is more advantageous than by the earlier methods used.

These differences are shown by the following table wherein the different values are for five different cases assuming the previously mentioned outlet temperatures— these cases being common counterflow, common parallel flow and arrangements according to (a) and (b) and arrangements according to this invention combining counterflow with part parallel flow.

| Method | Lowest metal temp., ° C. | Increase in flue gas loss in relation to counterflow, percent | Decrease in temp. of preheated air, ° C. | Air thru htr. at counterflow = 100%, percent |
| --- | --- | --- | --- | --- |
| Common counterflow | 115 | | | 100 |
| Common parallel flow | 258 | 40 | 94 | 100 |
| Cold air bypassing | 193 | 69 | 164 | 40 |
| Hot air recirculation | 193 | 21 | 52 | 350 |
| Combined counter and parallel flow | 193 | 31 | 74 | 100 |

As shown by the table, the arrangements proposed are in overall more advantageous than the methods heretofore used.

Control of the wall temperatures is obtained by proper distribution through dampers 22 and 23 of the air quantities passed in parallel and counterflow respectively. This can also be done by the use of movable sector plates in rotating types of heat exchangers. This control can be done automatically by a sending instrument actuated by the wall temperature and of the dew point of the flue gases and which instrument actuates a control for adjusting the air flows.

What I claim is:

1. In an air preheater or the like having metallic surfaces for the transfer of heat to relatively cool air from hot corrosive gases whose temperature in the transfer of heat is reduced to a point approaching the dew point of the gases and subjects the metallic heat transfer surface to the deleterious effects of said substances in the presence of condensation; separate inlet and outlet ducts connected to the air preheater so as to direct a stream of gases therethrough in one direction in contact with said heat transfer surfaces; inlet and outlet ducts means for directing portion of the total volume of air to be heated in contact with the heat transfer surface in counterflow with respect to the direction of flow of the stream of gases from which said portion of the total air volume absorbs heat; another air inlet duct connected to said preheater at its air inlet end so as to direct another portion of the total volume of air through the air preheater in a direction parallel to the flow through the preheater of the stream of gases from which said second portion of the total volume of air absorbs heat; means for apportioning the total volume of air between the inlet duct connected for the flow of air in parallel and the inlet duct connected for directing the stream of air in counterflow; and an air outlet duct so connected as to conduct said parallel flowing stream of air away from the preheater.

2. In an air preheater or the like having metallic surfaces for the transfer of heat to relatively cool air from hot corrosive gases whose temperature in the transfer of heat is reduced to a point approaching the dew point of the gases and subjects the metallic heat transfer surface to the deleterious effects of said substances in the presence of condensation; separate inlet and outlet ducts connected to the air preheater so as to direct a stream of gases therethrough in one direction in contact with said heat transfer surfaces; inlet and outlet ducts means for directing a portion of the total volume of air to be heated in contact with the heat transfer surface in counterflow with respect to the direction of flow of the stream of gases from which said portion of the total air volume absorbs heat; another air inlet duct connected to said preheater at its air inlet end so as to direct another portion of the total volume of air through the air preheater in a direction parallel to the flow through the preheater of the stream of gases from which said portion of the total air volume absorbs heat; means for apportioning the total volume of air between the inlet duct connected for the flow of air in parallel and the inlet duct connected for directing air in counterflow; and an air outlet duct so connected as to conduct said parallel flowing portion of total volume of air to the outlet duct for the counterflowing portion of the total volume of air so as to rejoin the latter portion.

3. In a regenerative air preheater having a housing providing first and second main passages therethrough for hot gases and cool air, respectively, inlet and outlet ducts connected to the ends of said passages for the counterflow of gas and air therethrough, and a rotor carrying material through said passages for absorbing heat from hot gases and imparting it to air; means forming a third air passage having an inlet outlet in the housing so located between said gas and air passages that the heat absorbing material on traversing the aforesaid gas and air passages passes through said third passage prior to re-entering said gas passage; a branch conduit connecting said air inlet duct to said third passage at the end thereof adjacent the gas inlet end of said housing so that the air passing through the rotor via said third passage flows parallel to the direction of gas flow through the housing; another branch duct connecting with the air outlet end of said third passage; and damper means associated with the main air passage and said third passage through the housing for apportioning the total volume of air between said main and third passages for flow in counterflow and parallel respectively through the rotor with respect to the direction of the single stream of gas.

4. In a regenerative air preheater having a rotor carrying material for absorbing heat from hot gases and imparting it to air; a housing enclosing said rotor, end plates for said housing at opposite ends of the rotor having a pair of aligned openings for the admission and discharge of a single stream of hot gases and two circumferentially spaced pairs of aligned openings for the admission and discharge of two separate air streams to flow to and through the rotor, gas inlet and outlet ducts communicating with the first pair of openings in said end plates for the flow of gas in one direction through the rotor, and air inlet and outlet ducts; the improvement comprising branch conduits connecting said air inlet duct to one opening of one pair of said two pairs which opening is located in the end plate at the gas outlet end of said housing and connecting the other opening of said pair which is located in the opposite end plate so as to provide for counterflow of a stream of air with respect to the stream of gas; branch ducts connecting the air inlet duct to one opening of the second pair of said two pairs which opening is in the end plate at the gas inlet end of said housing and connecting the air outlet duct with the other opening of said second pair which opening is located in the end plate at the gas outlet end of the housing; and damper means associated with the branch ducts connected to said air inlet duct for apportioning the total volume of air between said ducts for flow in counterflow and parallel respectively through the rotor with respect to the direction of said single stream of gas.

5. In a regenerative air preheater having a rotor carrying material for absorbing heat from hot gases and imparting it to air, a housing enclosing said rotor, and end plates for said housing at opposite ends of the rotor having a pair of aligned openings for the admission and discharge of a single stream of hot gases and two circumferentially spaced pairs of aligned openings for the admission and discharge of two separate air streams to flow to and through the rotor, gas inlet and outlet ducts communicating with the first pair of openings in said end plates for the flow of gas in one direction through the rotor; and an air inlet duct; the improvement comprising a branch conduit connecting said air inlet duct to one opening of one of said two pairs which opening is located in the end plate at the gas outlet end of said housing; an air outlet duct; another branch conduit connecting said air outlet duct with the other opening of said one pair which opening is located in the end plate at the gas inlet end of said housing so as to provide for counterflow of part of the air from said inlet duct with respect to the stream of gas; another branch duct connecting the air inlet duct to one opening of the second pair of said two pairs which opening is in the end plate at the gas inlet end of said housing; and another duct connected with the other opening of said second pair which opening is located in the end plate at the gas outlet end of the housing, and damper means associated with the branch ducts connected to said air inlet duct for apportioning the total volume of air between said ducts for flow in counterflow and parallel respectively through the rotor with respect to the direction of said single stream of air.

References Cited in the file of this patent

UNITED STATES PATENTS

| | | |
|---|---|---|
| 1,929,176 | Leilich | Oct. 3, 1933 |
| 2,230,799 | Hobbs | Feb. 4, 1941 |
| 2,321,129 | Cooper | June 8, 1943 |
| 2,429,619 | Hamblin | Oct. 28, 1947 |
| 2,480,277 | Yerrick | Aug. 30, 1949 |
| 2,607,564 | Yerrick | Aug. 19, 1952 |